Aug. 4, 1970   ISAMU WASHIZUKA ET AL   3,523,284
INFORMATION CONTROL SYSTEM

Filed June 23, 1967                    4 Sheets-Sheet 1

INVENTORS
ISAMU WASHIZUKA
KUNIO YOSHIDA
BY
ATTORNEY

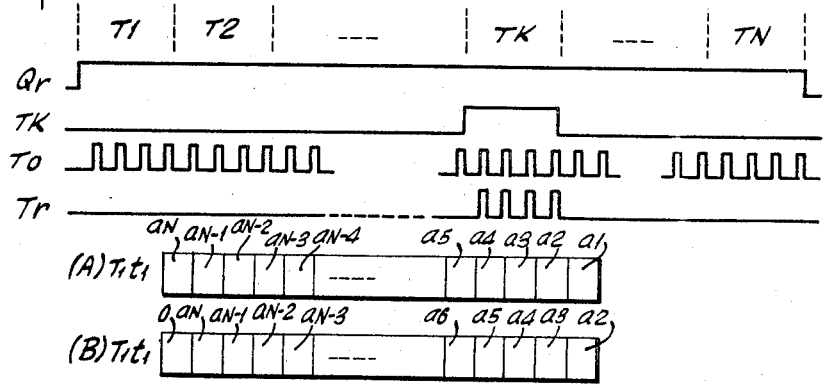
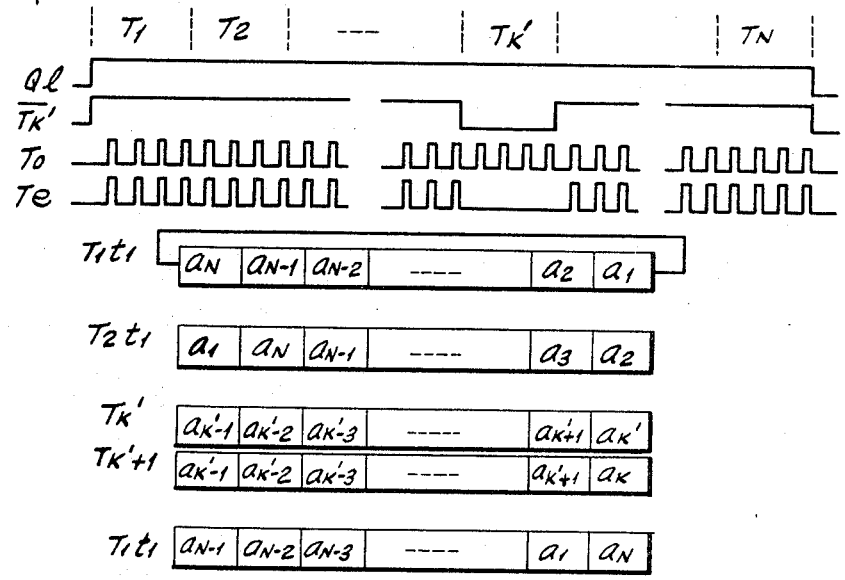
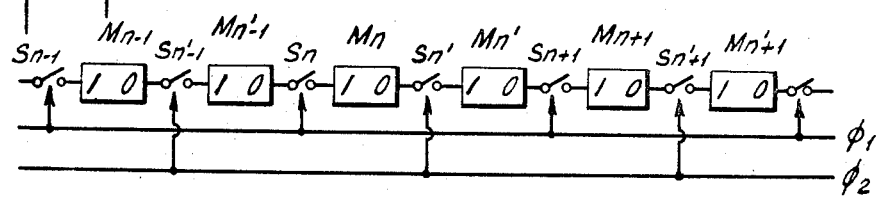

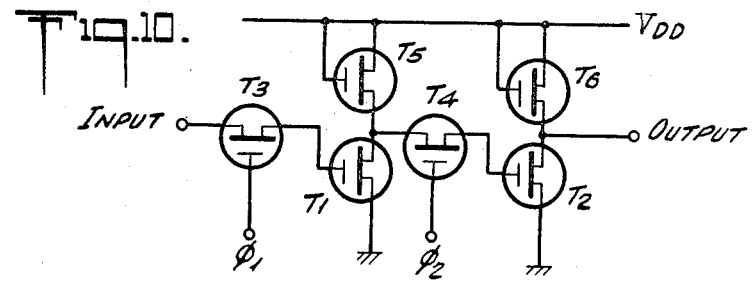
Fig.10.
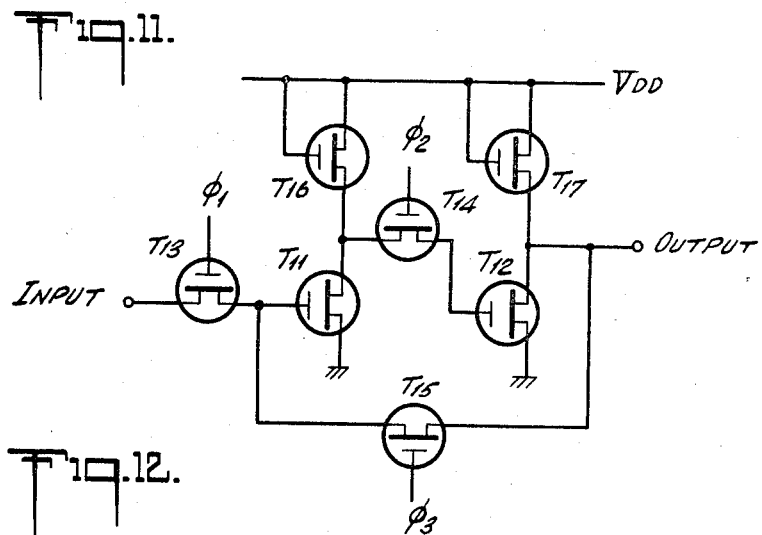
Fig.11.
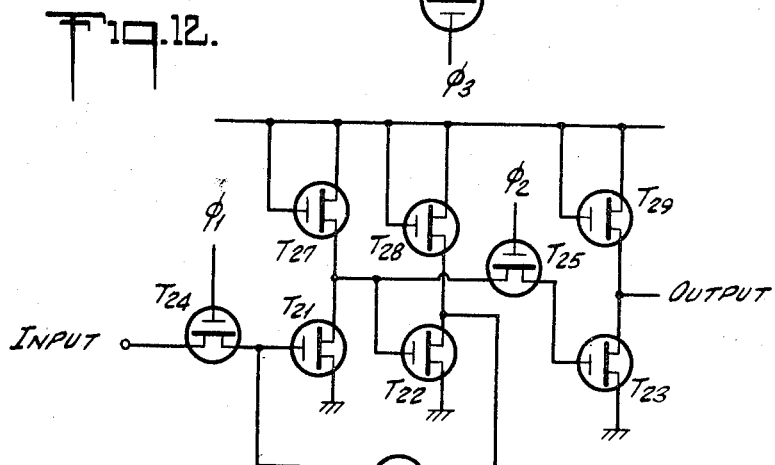
Fig.12.
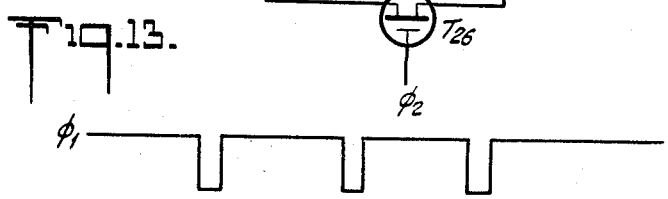
Fig.13.

United States Patent Office 3,523,284
Patented Aug. 4, 1970

3,523,284
INFORMATION CONTROL SYSTEM
Isamu Washizuka, Osaka-shi, and Kunio Yoshida, Yamatokoriyama-shi, Japan, assignors to Hayakawa Denki Kogyo Kabushiki Kaisha, Osaka-shi, Osaka-fu, Japan, a company of Japan
Filed June 23, 1967, Ser. No. 648,331
Claims priority, application Japan, July 1, 1966, 41/43,168; Sept. 19, 1966, 41/62,095
Int. Cl. G11c 11/40
U.S. Cl. 340—173     1 Claim

ABSTRACT OF THE DISCLOSURE

An information control system utilizing a synchronous dynamic memory system for dynamically storing information, a control device which controls the transmission of information from the dynamic memory by modifying one or more synchronizing signals for a specific period of time and in accordance with the particular type of computation to be effected.

---

Figure 1:
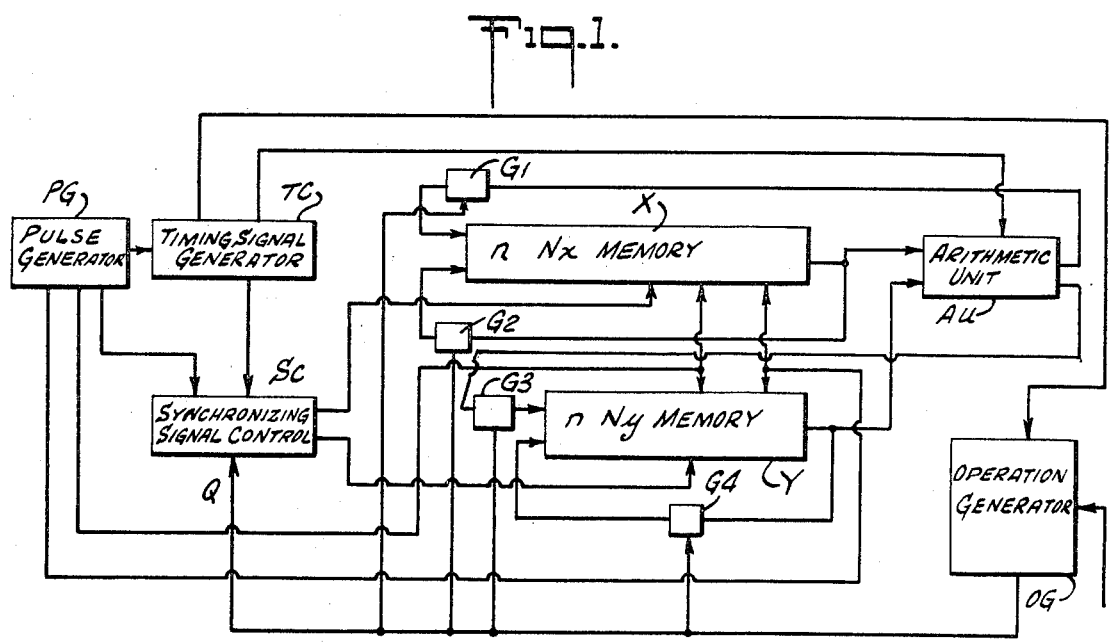

This invention relates to an information control system, and, more specifically, to novel and improved electrical circuitry for electronic computers, such as table type computers and the like, which greatly facilitates the processing of data.

In small electronic computers, it is desirable to simplify the operation of the control systems and minimize the number of components. Furthermore, with the utilization of semi-conductors in computer design, improved computer circuits utilizing semi-conductors are necessary in order to both simplify and improve computer operation. Prior known information control systems have relied upon the inherent stray capacitance existing between the gate electrode and the substrate of a MOS field effect transistor to afford temporary storage of information. However, such systems have required a relatively large number of logic circuits for selecting a desired mode of circulation and relatively complicated means for shifting information within a register. Furthermore, the logic circuits have required a separate control system with the result that these prior devices were exceedingly complicated, and the utilization of integrated circuits for such purposes was difficult because of the large number of terminals required. Accordingly, one object of the invention resides in the provision of an improved semi-conductor circuit which will effectively control and process information and overcome the disadvantages of prior known semi-conductor circuitry which has limited storage time.

Another object of the invention resides in the provision of a novel and improved information control system for synchronous digital electronic computers which includes a dynamic shift register controllable by a plurality of synchronizing signals of the same fundamental period but of different phases and wherein at least one of the synchronizing signals is variable for a specific period to control and process the information in the register.

Still another object of the invention resides in the provision of an improved information control system utilizing a simplified circuit configuration which enables the attainment of desired operations without the necessity for separate loops in a dynamic memory using MOS field effect transistors.

A still further object of the invention resides in the provision of an improved information control system wherein a reduced number of logic circuits are required to effect shift control and which can be advantageously obtained by the utilization of integrated circuits.

The foregoing objects are attained by the use of an information control system having a plurality of cascaded memory elements, each of which includes a MOS field effect transistor which by reason of its internal gate capacitance will store information in the form of an electric charge for a predetermined period of time The number of memory elements corresponds to the number of bits to be stored. The storage of information in said memory elements and the transfer of information from one memory element to the next is controlled by at least two signals which are fed to the memory units. Through the control of these signals in accordance with specific instructions, the stored information can be shifted to the left or to the right and can be circulated with the dynamic memory unit. The invention further embodies logic means for modifying at least one of the control signals applied to the dynamic memory elements in accordance with specific instructions to effect the desired shift operation.

Because a stored charge in a MOS field effect transistor will gradually decrease because of leakage currents, such charge will exist for as much as several seconds, and accordingly, the frequency of the control pulses can be varied over a range of one cycle to several megacycles per second. By utilizing a variable frequency control pulse and changing the frequency of the control pulse for a specific time within the time of a word-length, stored information can be shifted to the left or right at the end of the time of a word-length. Means for changing the frequency of the control pulse can be effected by merely interrupting the control pulse. Accordingly, the circuit required for control can be greatly simplified and power consumption considerably reduced.

The above and other objects and advantages of the invention will become more apparent from the following description and accompanying drawings forming part of this application.

Figure 2:
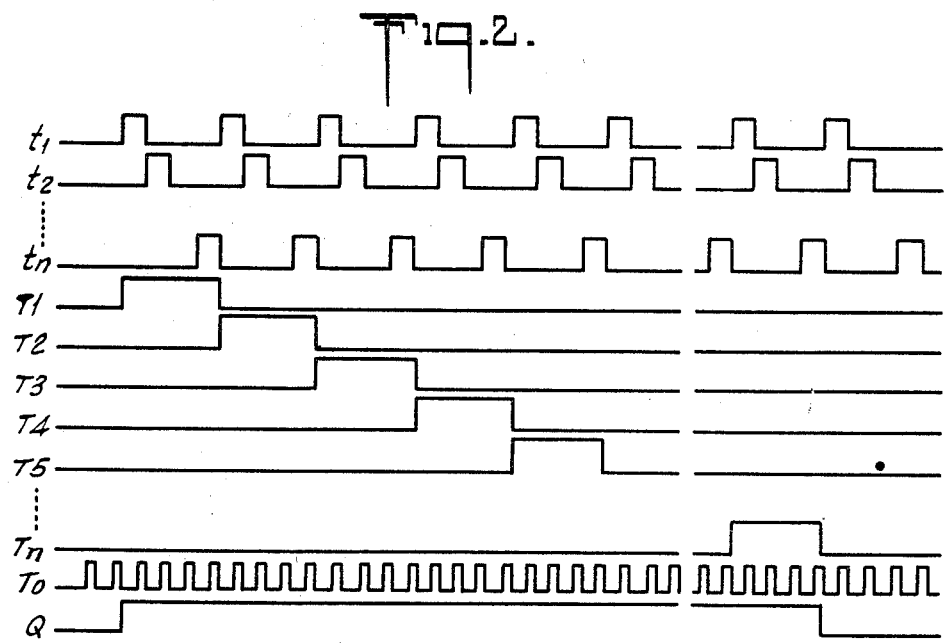
Figure 6:
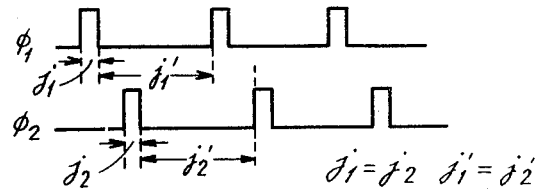
Figure 7:
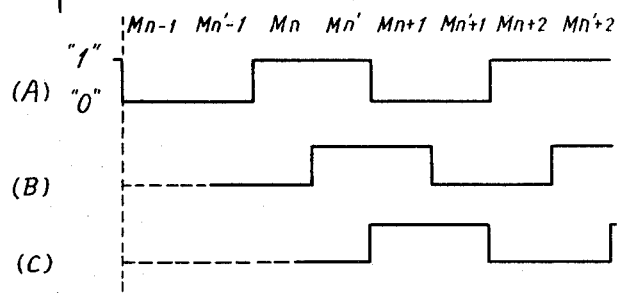
Figure 8:
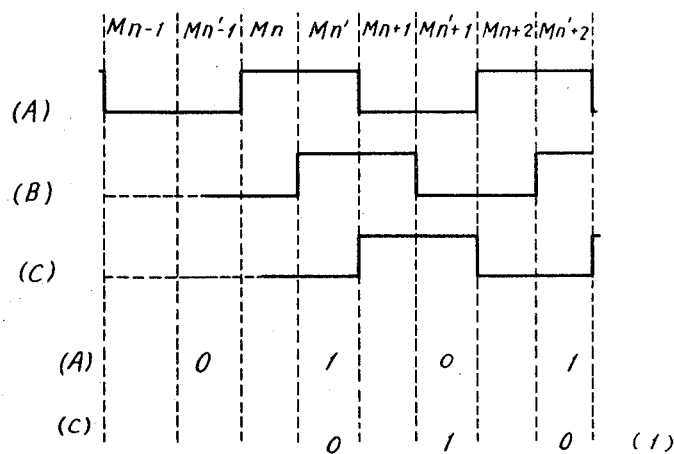
Figure 9:
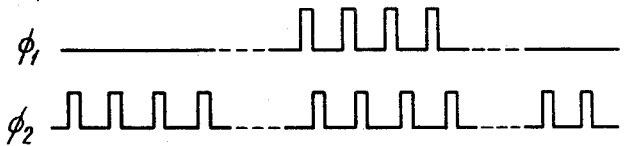

In the drawings:
FIG. 1 is a block diagram of a control system embodying the invention;
FIG. 2 is a chart showing the relative phases of the timing signals;
FIGS. 3 and 4 are charts illustrating the storage of information by the shift control system;
FIG. 5 is a block diagram illustrating the basic structure of the dynamic memory system;
FIG. 6 is a graph showing the phase relationships of the switching signals;
FIGS. 7 and 8 are graphs illustrating the operational status of certain elements of the dynamic memory system;
FIG. 9 is a graph illustrating the switching signals resulting from a variable frequency control in the case of a right-hand shift operation;
FIG. 10 is a circuit diagram in accordance with the invention illustrating one embodiment of a dynamic memory system;
FIG. 11 is a circuit diagram in accordance with another embodiment of a dynamic memory system;
FIG. 12 is a circuit diagram of still another embodiment of a dynamic memory system in accordance with the invention; and
FIG. 13 is a graph illustrating the phase relationship between three switching signals.

Referring now to the drawings, and, more specifically to FIG. 1, X and Y are memory systems, each including a series of synchronous shift registers for storing $N_x$ and $N_y$ digits, respectively, and wherein one digit comprises $n$ bits. It is to be understood that $N=N_x$ when $N_x \leq N_y$ and $N=N_y$ when $N_y$ is $\leq N_x$ and wherein N digit time is defined as the time of one word-length.

AU is an arithmetic unit for producing addition and subtraction with respect to the contents transmitted by elements X and Y and which produces an output which is returned to either or both of the memory elements X and Y. PG is a pulse generator which produces a fundamental signal and the generated output is supplied to the timing signal generator TC and to the synchronizing signal generator SC. TC generates a bit time signal and a digit time signal in response to the fundamental signal produced by the pulse generator PG. OG is a so-called operation generator having the longest processing time for information received, such as circulation, left-hand shift, right-hand shift, and arithmetic operations, as the time of one word-length and selection and generation of desired instructions in response to an operating instruction from the input and the output devices (not shown) is the time of a word-length unit and one instruction is derived during the time of word-length. SC is a synchronizing signal generator which decodes the fundamental pulse timing signal from generator TC and generates a synchronizing signal for the memory elements X and Y. It is to be understood that the synchronizing signal for the memory elements X and Y corresponds to the instruction signal. G1, G2, G3 and G4 are logic gates for controlling the numerical information and synchronizing signals which are supplied to the memory elements X and Y.

Referring now to FIG. 2, $t_1, t_2 \ldots t_n$ are bit time signals and $T_1, T_2 \ldots T_n$ are digit time signals. As evident from the figure, the bit time signals are derived in the order of $t_1 - t_2 - \ldots t_n - t_1$ and the digit signals are derived in the order of $T_1 - T_2 - \ldots T_n - T_1$ with the lapse of time. A period from $t_1$ to $t_n$ is one digit time. A new digit time begins from the next $t_1$ and continues to $t_n$. The ensuing digit time begins at the time of the next $t_1$. These timing signals are derived from the timing signal generator TC as described above. A fundamental synchronizing signal $T_o$ may be an output produced by the pulse generator PG converted by a suitable converter or it may be an output of the pulse generator itself. As described above, an instruction signal Q is derived over the time of one word-length and continues from $T_1$ to $T_n$. The figure illustrates a situation wherein $n=4$ and wherein the maximum amplitude of each wave form corresponds to "1" and the low level corresponds to "0."

FIGS. 3 and 4 illustrate the operation of the memory elements X and Y. The information stored in the memory elements or registers X and Y is generally shifted to the right by applying synchronizing signals derived from the generator SC, that is, each synchronizing signal will shift the information by one bit so that $n$ bits or one digit will be shifted by $n$ synchronizing signals. Accordingly, the information is shifted to the right by P digits by the derivation of $nP$ synchronizing signals. Since the contents of a memory element or register may be shifted by only one digit when it is required to be shifted to the right, P may, therefore, equal 1 so that $P=N$ when the information required is to be circulated or other information must be stored. When the contents of a memory element or register are required to be shifted to the left, the least significant digit (right side) of the output of the register may be used as the input so that $P=N-1$. From the foregoing description, it is apparent that the memory elements or synchronous registers X and Y are always circulating information in a dynamic mode and at periods of time of one word-length. If the synchronizing signals are interrupted for a period of a digit time within an arbitrary time of one word-length, the content of the memory register can be shifted to the left. On the other hand, if the synchronizing signals are interrupted for periods other than a digit time and the circulation path is also interrupted for the time of one word-length, the register is shifted to the right. In this case, since the time of one word-length is handled as one unit the state of a memory element after completion of each shift corresponds to the weight of the digit designated by the character of the timing signal generator TC. Considering now three types of instructions, namely, right shift, left shift and circulation, which are produced by the memory element or register X by the respective synchronizing signals $T_1, T_a, T_r$ when $N=N_x$;

$$T_r = Q_r \cdot t_o \cdot T_k$$
$$T_1 = Q_1 \cdot t_o \cdot T_k$$
$$T_a = Q_r \cdot Q_1 \cdot t_o$$

In the foregoing equations, $Q_r$ is a right-shift instruction, $Q_1$ is a left-shift instruction, and $T_k$ and $\overline{T}_k$ are digit times. When both left- and right-shift instructions are not generated, the fundamental synchronizing signal $T_o$ is always supplied and the contents of the register continues to circulate in a dynamic fashion and at a period of time corresponding to a word-length which is synchronized with the fundamental synchronizing signal $T_o$ so that the state of circulation is, therefore, not shown in the time chart. Interruptions of these synchronizing signals can be readily controlled by the use of the output of a logic circuit having three inputs, namely, an instruction from the operation generator OG, the state of the timing signal generator TC and the presence of a synchronizing signal $\phi$ from the pulse generator PG. The time chart or graph of FIG. 3 represents a synchronizing signal derived from a right-shift instruction $Q_r$ and the state of the storage of the register. Since the synchronizing signal is derived only during the period corresponding to the digit time, $T_k$, $n$ signals are generated and the stored contents of the register X which has been in a state (A) before the time of the one word-length starts then changes to state (B).

The time chart of FIG. 4 represents a synchronizing signal derived by a left-shift instruction $Q_1$ and the state of the storage of the register. Since the synchronizing signal is not derived during a period corresponding to the digit time $T_{k'}$, the stored content is shifted digit by digit to the right during digit time periods but is not shifted during the digit time period $T_{k'}$. The shift operation is executed again during the period of the next digit time $T_{k'+1}$ and eventually when the time of one word-length is completed the information in the register is shifted to the left, as shown in the lowermost part of the drawing.

The digital memory used in the control system and its operating conditions will now be described.

Referring to FIG. 5, $M_{n-1}, M_{n'-1}, M_n, M_{n'}, M_{n+1}, M_{n'+1} \ldots$ are memory units for storing electrical signals. $S_{n'-1}, S_{n-1}, S_n, S_{n'}, S_{n+1}, S_{n'+1} \ldots$ are switching means which are actuated by switching signals. The energy storing elements are operated in such a manner that the energy or an electrical signal stored in a preceding stage is transmitted to the input I of the succeeding stage when the intervening switch connecting the output O of the preceding stage to the input I of the succeeding stage is closed. Accordingly, energy supplied to the input of a stage is derived from the output to provide a directivity of energy. In case energy is propagated to succeeding elements or stages, the internal conditions of the elements need not be changed. The switches are actuated by signals $\phi_1$ and $\phi_2$.

The time chart of FIG. 6 illustrates the phase relationship between the switching signals $\phi_1$ and $\phi_2$. It will be observed that the periods of the switching signals $\phi_1$ and $\phi_2$ are identical, but the phases differ and the switching signal $\phi_2$ occurs within a duty cycle of the switching signal $\phi_1$. The difference between the phases of the switching signals $\phi_1$ and $\phi_2$ is based upon the following considerations. If the phases of the signals are the same, all of the switches will be actuated to the "on" position at the same time and information stored in the first stage will be instantaneously transmitted to the last stage with no intervening delay. A digital delay device may be utilized by combining a two phase transmission switching operation thus providing a dynamic shift register. The phase of the switching signal $\phi_2$ is identical to that of the fundamental synchronizing signal $T_o$.

By way of example and with reference to FIG. 7, let it be assumed that the state (A) occurs first. In the drawing, the high and low level operations of the wave form indicate levels corresponding to "1" and "0," respectively, which energy is stored in the respective memory units. In the case of state (A), memory elements $M_n$, $M_{n'}$, $M_{n+2}$, and $M_{n'+2}$ store energies corresponding to "1."

If the switching signal $\phi_1$ attains a level operable to operate the switches, switches $S_{n-1}$, $S_n$ and $S_{n+1}$ will be driven into the "on" state. Under these ionditions, the memory element $M_{n-1}$ stores "1" or "0" depending upon the energy condition of the preceding stage. Similarly, the memory element $M_n$ stores information in the memory element $M_{n'-1}$ and the memory element $M_{n+1}$ stores information received from the memory element $M_{n'}$. Assuming that the energy level of the element in the next stage is not changed even if energy is supplied thereto, information signals stored in the memory elements $M_{n'-1}$, $M_{n'}$, $M_{n'+1}$ ... are not changed and the elements having primes (') remain unchanged. These states are shown at (B) in FIG. 7.

When the switching signal $\phi_1$ attains an "off" position and thereafter the switching signal $\phi_2$ attains an "on" position the information signals stored in memory elements $M_{n-1}$, $M_n$, and $M_{n+1}$ are transmitted to the memory elements $M_{n'-1}$, $M_{n'}$, and $M_{n'+1}$, respectively, while the states of the memory elements $M_{n-1}$, $M_n$, and $M_{n+1}$ ... remain unchanged.

When the switching signals $\phi_1$ and $\phi_2$ attain "on" levels in sequence, the contents of the memory elements $M_{n'-1}$, $M_n$, and $M_{n'+1}$ are transmitted to the memory elements $M_{n'}$, $M_{n'+1}$ and $M_{n'+2}$. The same result is also obtained when the contents of a certain device has attained the state of "1" and "0."

If a memory elements is driven into an energy state corresponding to "0" then when the information is transmitted to the next stage, the state (A) of FIG. 7 is converted to a state shown in FIG. 8. The numerals in the lower part of FIG. 8 denote the memory levels of the transmitted information signals.

When the switches $S_{n-1}$, $S_{n'-1}$, $S_n$, $S_{n'}$ ... are in an "off" position for a relatively long time, a static flip-flop can store the energy regardless of time but a dynamic flip-flop has a tendency to permit a decrease in energy with the lapse of time since its duty cycle is limited. In general, a device which can control a delay time in a digital fashion, such as that shown in FIG. 5, has a substantial switching duty cycle. Considering a duty cycle in the case of a series dynamic register having N digits ($n$N bits). At least four or more synchronizing signals corresponding to the switching signals $\phi_1$ and $\phi_2$ of FIG. 5 are provided within a unit of time corresponding to one word-length. Therefore, if elements each having a facility such that the energy level can be kept in a state that information stored can be retained for at least the time of one word-length then the aforementioned difficulties become negligible. Accordingly, if $t_b$ is one bit time and $n$ is the number of bits in a digit and N is the number of digits in a register then the time during which information must be maintained is $t_b \cdot n \cdot N$, so that $$t_b \cdot n \cdot N < r$$

$$t_b < \frac{r}{nN}$$

where $r$ is the time in which an energy storing element must maintain stored energy in order to correctly transmit it to the next stage.

When there are a plurality of storing elements having different characteristics in a digital memory system, as shown in FIG. 5, if the signal period of a bit time of the entire system is determined as $t_b$ and if the transmitting time is $r$ then by applying at least one of the assumptions to the foregoing equation, it is possible to control information in a dynamic fashion utilizing MOS field effect transistors, switches and capacitors, switches and inductors, etc.

If a specific limitation is provided as to the period of the switching signals $\phi_1$ and $\phi_2$, as described above, dynamic control becomes possible. However, information control need not involve both switching signals $\phi_1$ and $\phi_2$. For example, in the case of a right shift, the switching signal $\phi_2$ may produce outputs within a period of time of one word-length, while the switching signal $\phi_1$ may be controlled to produce only four outputs.

FIG. 9 shows the phase relationships between the switching signals $\phi_1$ and $\phi_2$ in the case of a right-shift operation. Synchronizing signals may be produced only during a period of the digit time $T_k$ in which case only the switching signal $\phi_1$ need be controlled and the reason for this was described in connection with FIG. 5. Even if the switching signal $\phi_2$ is produced during the period $T_k$ and the switching signal $\phi_1$ is not produced, the energies stored in memory elements $M_{n'-1}$, $M_{n'}$ and $M_{n'+1}$ are maintained and will be transmitted to the memory elements of the next stages by the first switching signal $\phi_1$ which follows. The energy will again be transmitted to the successive elements by the next switching signal $\phi_2$.

FIG. 10 illustrates one embodiment of a circuit of a dynamic register utilizing MOS field effect transistors wherein a plurality of transistors are integrated to form a separate unit. The respective circuit elements each comprise an MOS field effect transistor though it will become apparent that some of these transistors do not have the specific transistor function. Transistors $T_1$ and $T_2$ serve to store information and operate as amplifying elements having storage times and the energy stored in the gate capacitances. The gate electrode of each transistor is connected to the output terminal of the preceding stage. The source electrodes are grounded and the drain electrodes are connected through a so-called "load resistor" to a power supply $V_{DD}$. The transistors $T_3$ and $T_4$ are switching elements operated by the switching signals $\phi_1$ and $\phi_2$. These switching signals are applied to the gate electrodes of the switching transistors and the source and drain electrodes constitute the switching circuit. Transistors $T_5$ and $T_6$ are connected between each drain electrode of the transistors $T_1$ and $T_2$ and the voltage source $V_{DD}$. These transistors operate as said "load resistors" for the transistors $T_1$ and $T_2$. When a series of flip-flop circuits, as described above, are used as memory units and connected in cascade, such flip-flop circuits constitute a dynamic memory system.

The foregoing description involves a dynamic memory system not employing a feedback loop even though a flip-flop circuit utilizing MOS field effect transistors is limited in storage time, it can, in effect, store information statically if an information feedback loop is provided between succeeding stages.

FIG. 11 is a circuit diagram of a feedback type of flip-flop circuit utilizing three switching signals $\phi_1$, $\phi_2$ and $\phi_3$. It will be observed that this circuit differs from the device described in connection with FIG. 10 in that it includes a feedback loop between the output of the transistor $T_{12}$ and the input of the transistor $T_{11}$. Transistor $T_{11}$ of FIG. 11 corresponds to the transistor $T_1$ of FIG. 10 while the transistor $T_{12}$ of FIG. 11 corresponds to the transistor $T_2$ of FIG. 10. Similarly, the transistors $T_{16}$ and $T_{17}$ correspond to transistors $T_5$ and $T_6$ while transistors $T_{13}$ and $T_{14}$ correspond to transistors $T_3$ and $T_4$. The circuit, as shown in FIG. 11, successively and dynamically circulates information stored in the gate internal capacitances of the storing elements $T_{11}$ and $T_{12}$, by reason of the circulation loop controlled by switching elements driven by the switching signals $\phi_1$, $\phi_2$, $\phi_3$ and the circuit operates to store information pertaining to one bit. In the event the switching signal $\phi_1$ is not applied to the switching transistor $T_{13}$ but only the switching signals $\phi_2$ and $\phi_3$ are applied to the switching transistors $T_{14}$ and $T_{15}$, the memory state is maintained and static storage of information becomes possible. When new information is introduced by the presence of the synchronizing signal $\phi_1$ the circulation loop is modified to store the new information by operation of the switching signal $\phi_2$.

FIG. 12 is still a further embodiment of the invention and includes in addition to the storing transistors $T_{21}$ and $T_{23}$ which correspond to $T_1$ and $T_2$ of FIG. 10 and additional storing transistor $T_{22}$. Transistors $T_{24}$, $T_{25}$ and $T_{26}$ operate as switching elements and $T_{27}$, $T_{28}$ and $T_{29}$ operate as the load resistance elements. Three phase switching signals are used for the following reasons. Assume that the output potential of a storing element in the first stage is to be transmitted to the gate internal capacitances of the storing element of the second stage after the path to the second stage is closed. Under this condition, a previously existing output potential of the storing element of the second stage tends to erase new information that may be inserted into the first stage. To avoid this disadvantage switching of the feedback loop, namely operation of transistor $T_{26}$, is effected after a time delay so that the fedback path will not be closed when the path between the first and second stages is closed. These circuits differ only in the nature of the switching signals but are otherwise identical in operation. In any event, switching control of the circulation and read-in is governed by the existence of the switching signal $\phi_1$. FIG. 13 illustrates the phase relationships of the switching signals $\phi_1$, $\phi_2$ and $\phi_3$.

In the application of an information control system in accordance with this invention, the switching signals $\phi_2$ and $\phi_3$ are generally maintained as they are and are not controlled by the synchronizing signal control device. To effect information control, namely circulation, right shift, left shift, etc., in the feedback type dynamic memory system, a pulse number control is utilized as described above but differs in that the switching signal $\phi_1$ need not be applied when the contents of the registers X and Y are to be maintained in a quiescent state.

While only certain embodiments of the invention have been illustrated and described, it is apparent that alterations, modifications and changes may be made without departing from the true scope and spirit thereof.

We claim:

1. An information control system comprising a dynamic memory unit having a plurality of cascaded bit storing memory elements, each of said elements including at least one MOS field effect transistor for temporarily storing an electric charge to record bit information, means generating at least two sets of pulses with the pulses of one set being synchronized with the pulses of the other set, connections between said dynamic memory and said generating means to apply said sets of synchronized pulses to said dynamic memory to circulate the stored information in a time related to the time of one word-length, instruction signal generating means producing signals to effect selected shift operations and connections between said instruction generating means and said pulse generating means, said instruction signal generating means including means for modifying the frequency of at least one of said sets of signals for a specific period within the time of a word-length and at a rate coordinated with the storage time of information in said elements whereby said instruction signals may effect any desired shift operation.

References Cited

UNITED STATES PATENTS

| | | | |
|---|---|---|---|
| 2,912,598 | 11/1959 | Shockley | 307—221 |
| 2,936,116 | 5/1960 | Adamson | 235—165 |
| 3,006,550 | 10/1961 | Johnson | 235—165 |
| 3,069,657 | 12/1962 | Green | 307—221 X |
| 3,395,292 | 7/1968 | Bogert | 307—221 |
| 3,406,346 | 10/1968 | Wanlass | 307—221 X |

TERRELL W. FEARS, Primary Examiner

U.S. Cl. X.R.

307—221